US011200724B2

(12) United States Patent
Saleh et al.

(10) Patent No.: US 11,200,724 B2
(45) Date of Patent: Dec. 14, 2021

(54) TEXTURE PROCESSOR BASED RAY TRACING ACCELERATION METHOD AND SYSTEM

(71) Applicant: Advanced Micro Devices, Inc., Santa Clara, CA (US)

(72) Inventors: Skyler Jonathon Saleh, Santa Clara, CA (US); Maxim V. Kazakov, Santa Clara, CA (US); Vineet Goel, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 375 days.

(21) Appl. No.: 15/853,207

(22) Filed: Dec. 22, 2017

(65) Prior Publication Data

US 2019/0197761 A1 Jun. 27, 2019

(51) Int. Cl.
*G06T 15/06* (2011.01)
*G06T 15/04* (2011.01)

(52) U.S. Cl.
CPC .............. *G06T 15/06* (2013.01); *G06T 15/04* (2013.01)

(58) Field of Classification Search
None
See application file for complete search history.

(56) References Cited

U.S. PATENT DOCUMENTS

| 2010/0289799 | A1* | 11/2010 | Hanika | G06T 15/06 345/421 |
| 2014/0340403 | A1* | 11/2014 | Droske | G06T 15/06 345/426 |
| 2016/0110910 | A1* | 4/2016 | Obert | G06T 15/005 345/426 |
| 2016/0292908 | A1* | 10/2016 | Obert | G06T 1/20 |
| 2017/0243375 | A1* | 8/2017 | Ceylan | G06T 15/005 |

* cited by examiner

*Primary Examiner* — Yingchun He
(74) *Attorney, Agent, or Firm* — Volpe Koenig

(57) ABSTRACT

A texture processor based ray tracing accelerator method and system are described. The system includes a shader, texture processor (TP) and cache, which are interconnected. The TP includes a texture address unit (TA), a texture cache processor (TCP), a filter pipeline unit and a ray intersection engine. The shader sends a texture instruction which contains ray data and a pointer to a bounded volume hierarchy (BVH) node to the TA. The TCP uses an address provided by the TA to fetch BVH node data from the cache. The ray intersection engine performs ray-BVH node type intersection testing using the ray data and the BVH node data. The intersection testing results and indications for BVH traversal are returned to the shader via a texture data return path. The shader reviews the intersection results and the indications to decide how to traverse to the next BVH node.

20 Claims, 20 Drawing Sheets

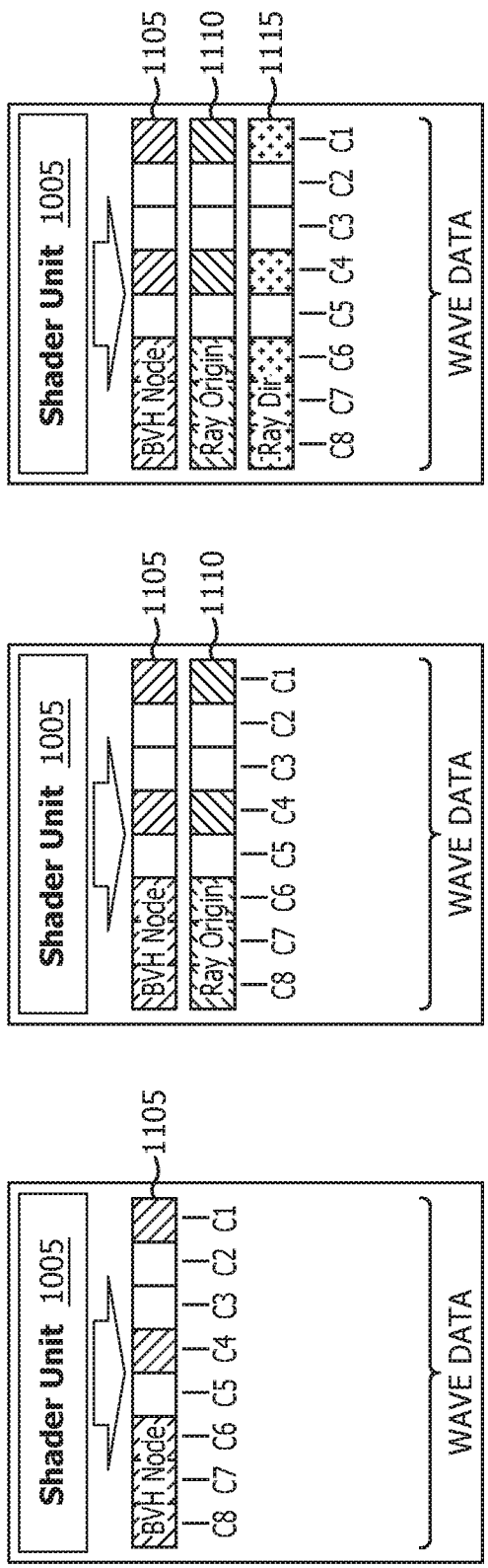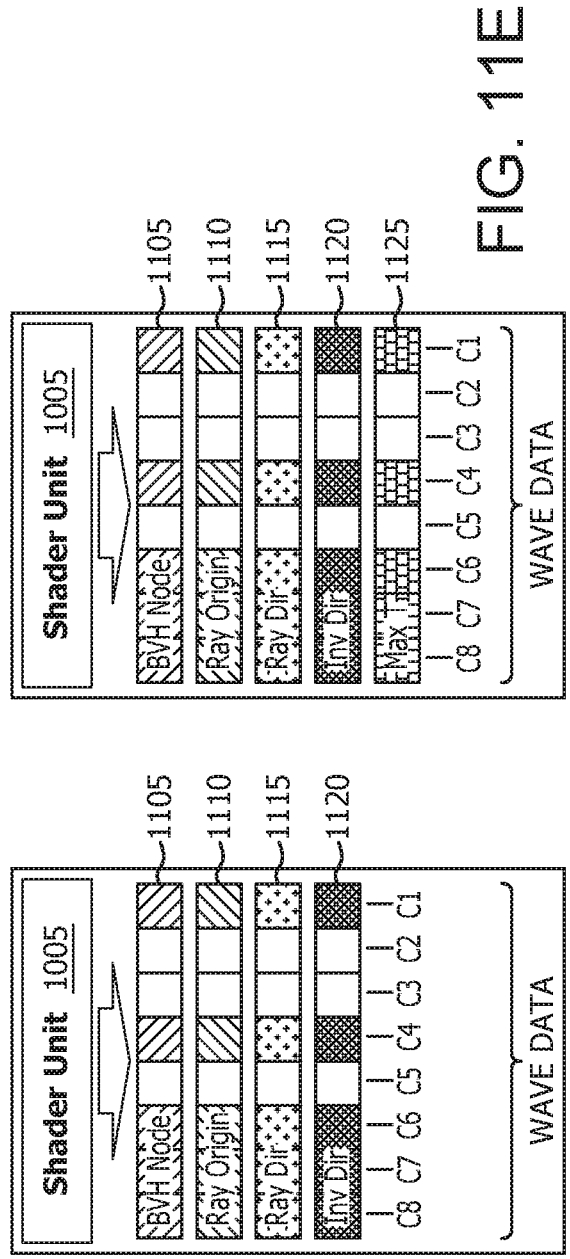

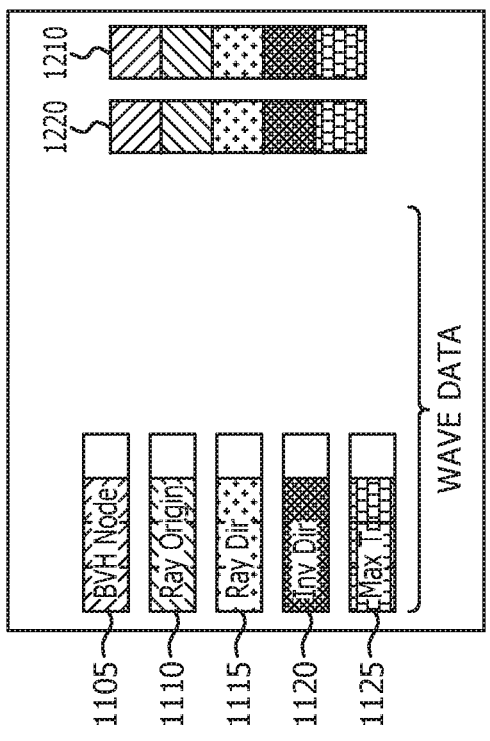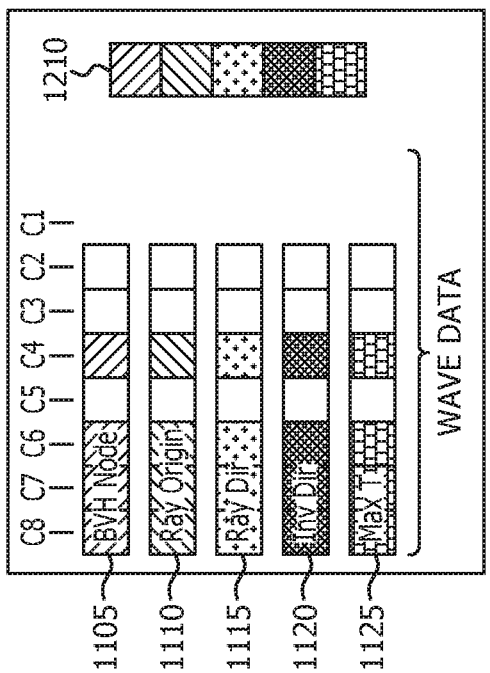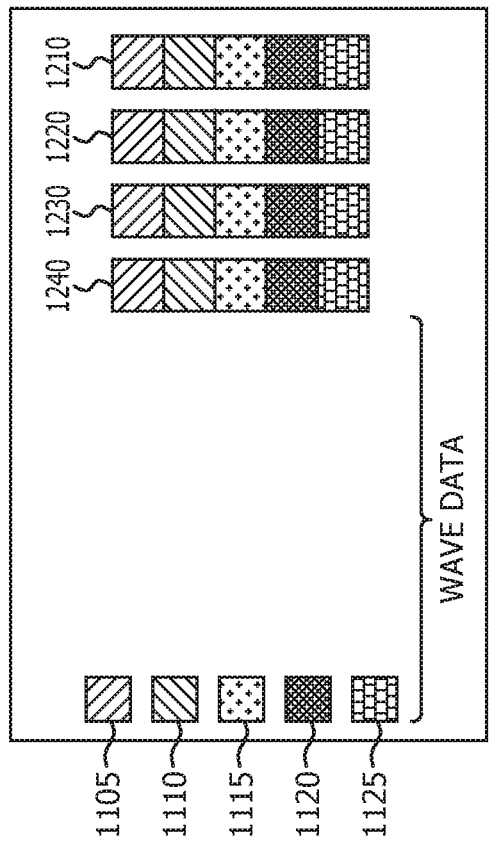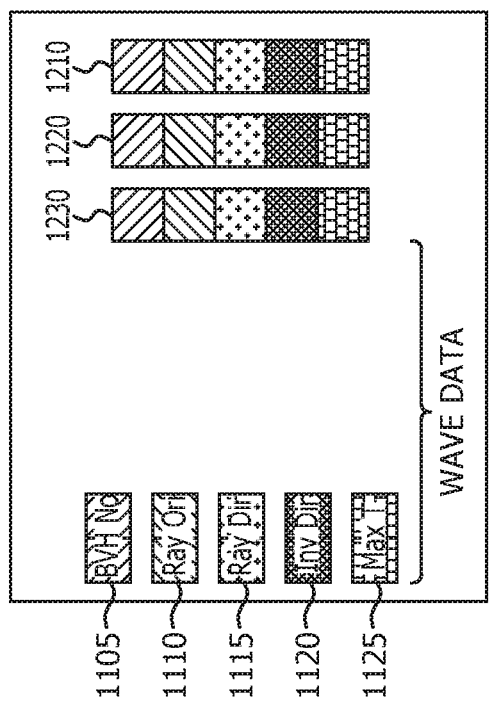

TEXTURE PROCESSOR BASED RAY TRACING ACCELERATION METHOD AND SYSTEM

BACKGROUND

Ray tracing is a rendering technique that generates three-dimensional (3D) imagery by simulating the paths of photons in a scene. There are two primary approaches for implementing ray tracing: software based solutions that implement ray tracing purely in compute unit based shaders and fully hardware based solutions that implement the full ray tracing pipeline in hardware. Software based ray tracing solutions suffer drastically from the execution divergence of bounded volume hierarchy (BVH) traversal which can reduce performance substantially over what is theoretically achievable. Additionally, software based solutions fully utilize the shader resources, which prevents material shading and other work from being processed concurrently. Moreover, software based solutions are very power intensive and difficult to scale to higher performance levels without expending significant die area.

While hardware based solutions may have better performance and efficiency than software based solutions because they can completely eliminate divergence, they suffer from a lack of programmer flexibility as the ray tracing pipeline is fixed to a given hardware configuration. Hardware based solutions are also generally fairly area inefficient since they must keep large buffers of ray data to reorder memory transactions to achieve peak performance. These large buffers can be over twice as large as the fixed function logic that does the calculation. Moreover, fixed function hardware based solutions generally have high complexity as they have to replicate the scheduling of ray processing that would ordinarily be handled automatically in a software based solution.

BRIEF DESCRIPTION OF THE DRAWINGS

A more detailed understanding can be had from the following description, given by way of example in conjunction with the accompanying drawings wherein:

FIGS. 11A-11E illustrate a shader unit sending an instruction to a texture processor in accordance with certain implementations;

FIGS. 12A-12F illustrate collection of wave data in a buffer to generate transactions in accordance with certain implementations;

DETAILED DESCRIPTION

Ray tracing is a rendering technique that generates three-dimensional (3D) imagery by simulating the paths of photons in a scene. Ray tracing can produce images having a very high degree of visual realism but at a greater computational cost. For example, searching for the closest triangle that intersects a ray is the most expensive operation in ray tracing. As a consequence, bounded volume hierarchy(ies) (BVHs) are used so that every ray doesn't need to be tested against every triangle. The BVHs are tree based structures that employ different types of nodes, including but not limited to, triangle nodes and box nodes. For purposes of illustration only, the description herein refers to triangle nodes and box nodes. Different nodes can be used without departing from the scope of the claims herein.

Figure 1:
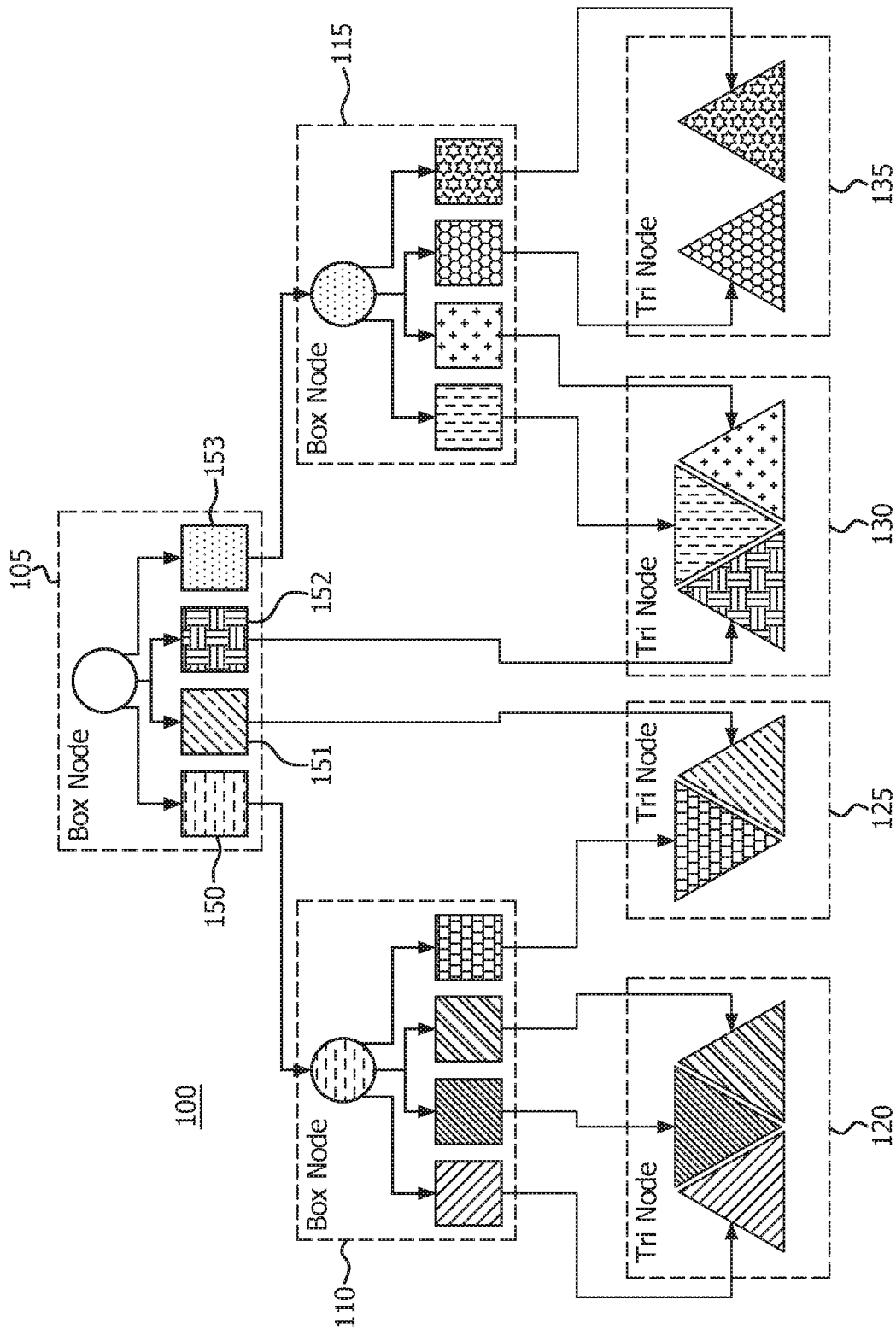
FIGS. 1-6 illustrate an example bounded volume hierarchy traversal.

An example illustration of a BVH 100 is shown in FIG. 1 and a description of an example traversal is illustrated with reference to FIGS. 1-6. The illustration uses triangle nodes which contain a single triangle and box nodes which have four boxes per node. These configurations are illustrative. Different node types can be used, the triangle nodes can have multiple triangles within the triangle node and box nodes can have any number of boxes.

Figure 2:
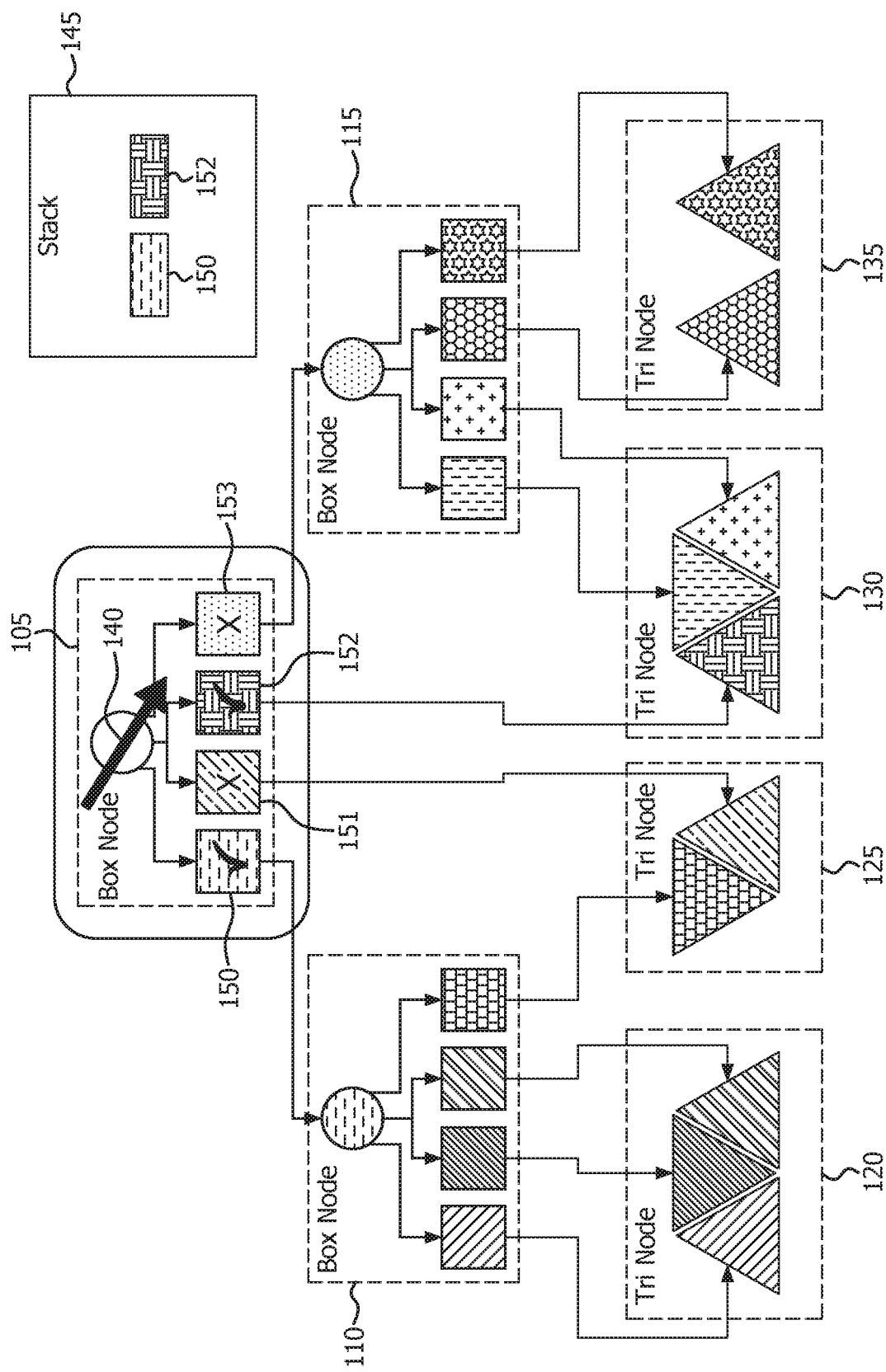
Figure 3:
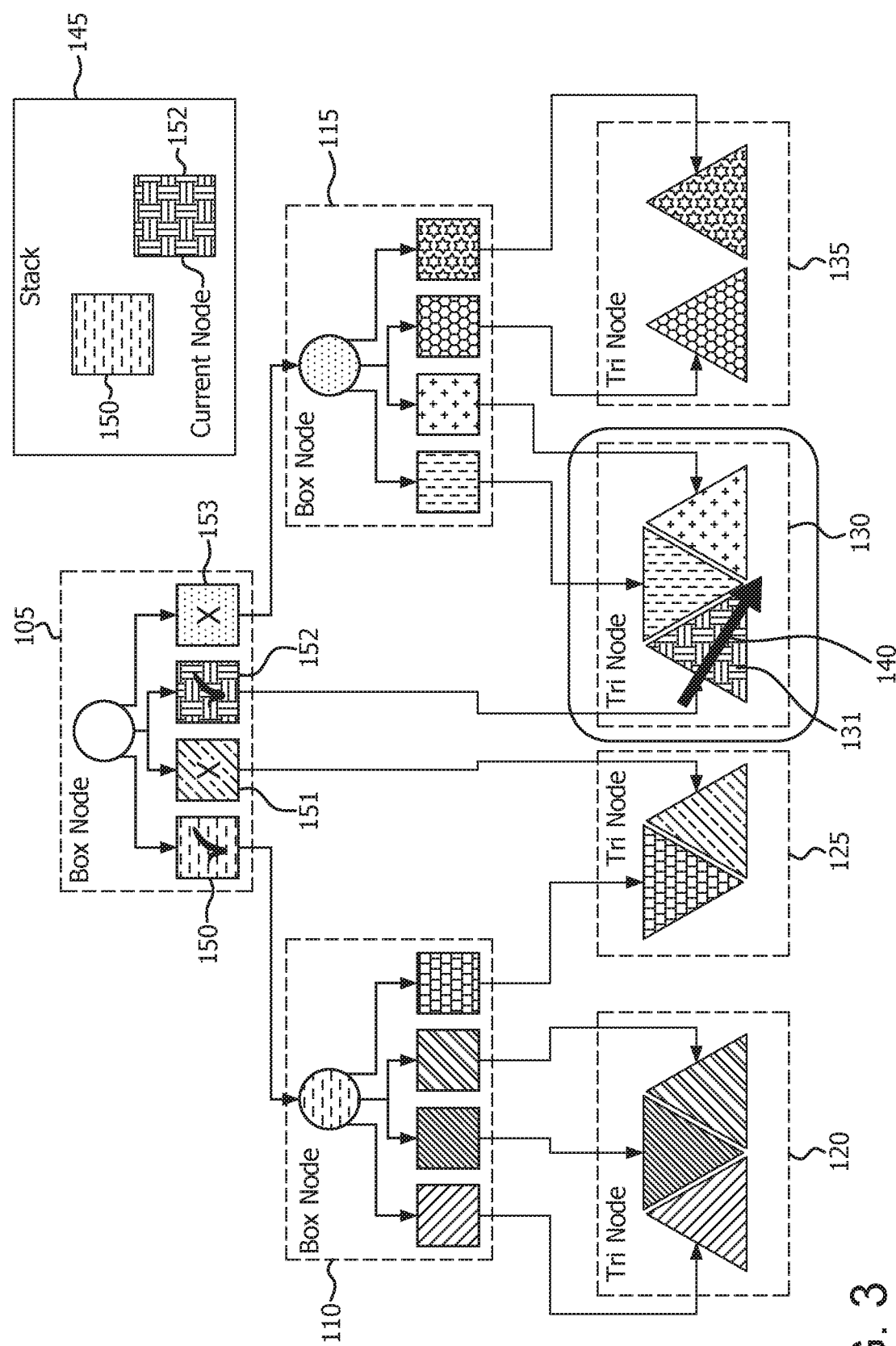
Figure 4:
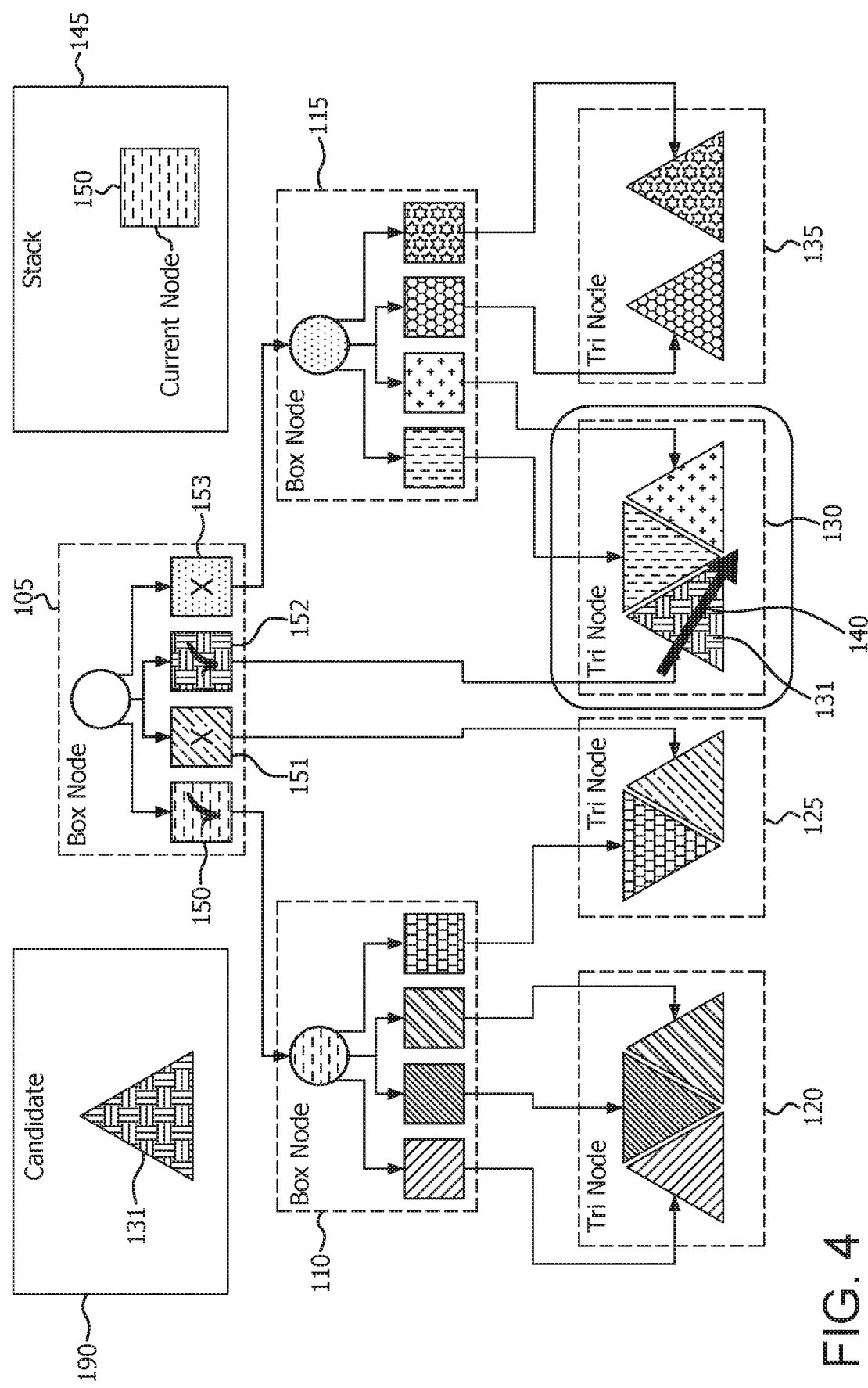

The illustrative BVH 100 includes box nodes 105, 110 and 115 and triangle nodes 120, 125, 130 and 135. Traversal of the BVH 100 starts by testing a ray 140 against a node at the root of the BVH 100 as shown in FIG. 2. In this example, the ray 140 is tested against all the bounding boxes, children 150-153, contained within the box node 105. The children nodes 150-153 that hit the ray 140 are added to a stack 145 in the furthest to closest order from the origin of the ray 140. In this example, the children nodes 150 and 152 are added to the stack 145. The last child node added to the stack 145 is popped and traversal moves to that child node as shown in FIG. 3. In this example, traversal moves to child node 152 and in particular, the triangle node 130 is examined. When triangle nodes are hit, the ray is tested against the single triangle in it. In an implementation with multiple triangles in the triangle node, the closest hit triangle is used for candidate triangle purposes. In this case, the ray 140 is tested against triangle 131. If the triangle hits and is closer than the next closest triangle found so far, the triangle is kept as the candidate triangle. In this case, the ray 140 intersects the triangle 131 and the triangle 131 now becomes candidate 190 as shown in FIG. 4.

Figure 5:
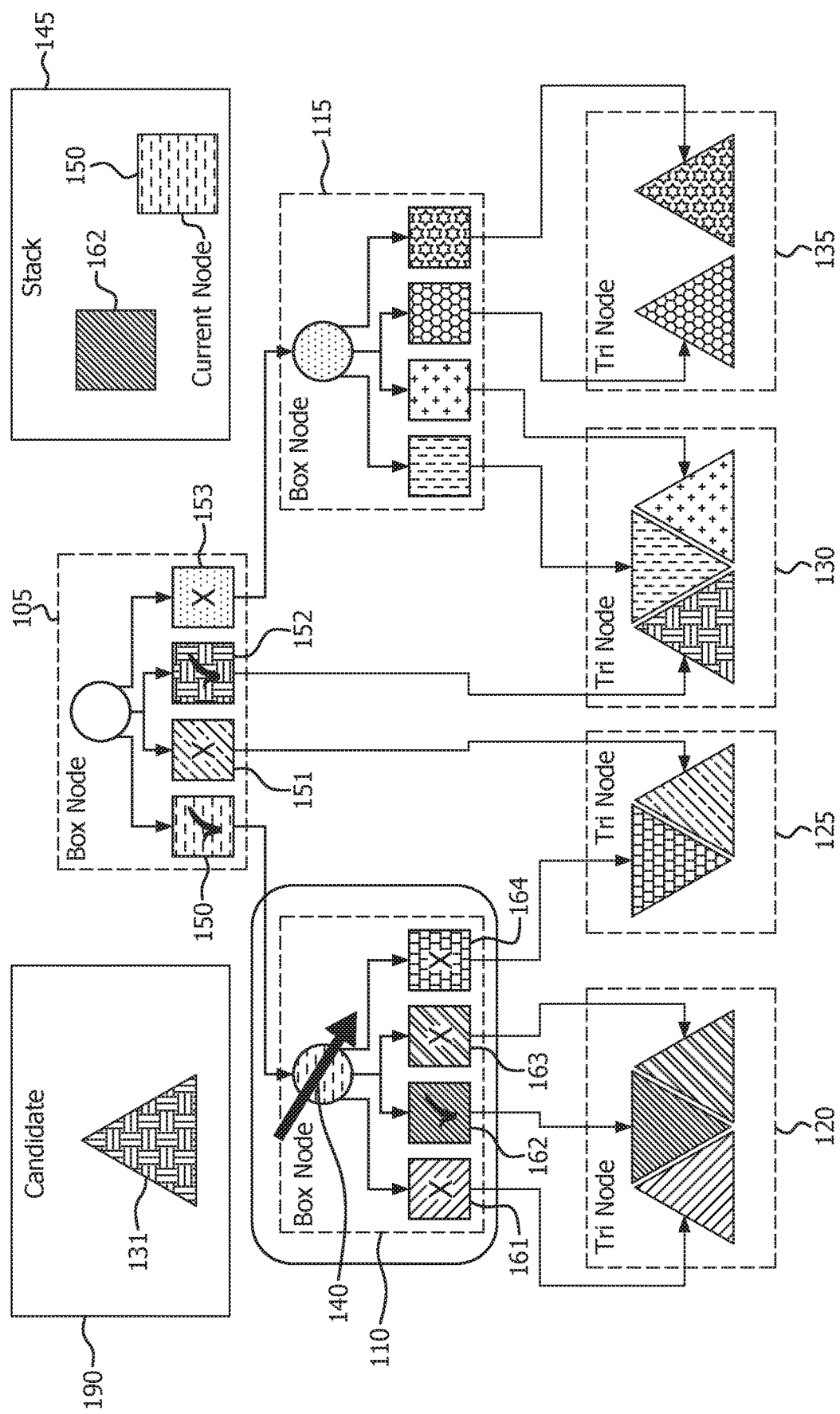
Figure 6:
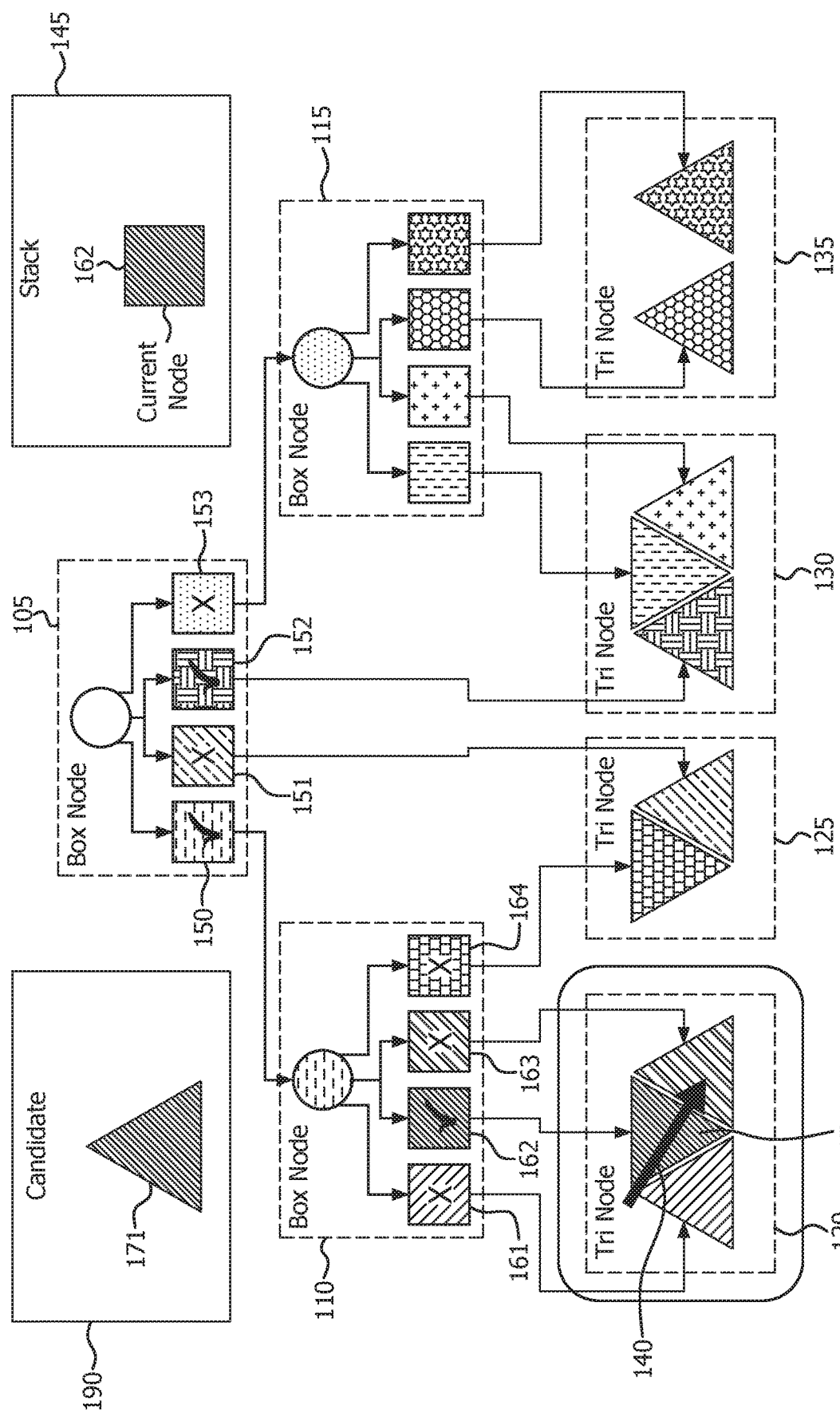

The next node is popped from the stack 145. In this case, the traversal moves to the child node 150 and in particular box node 110 as shown in FIG. 5. The ray is tested against all the bounding boxes in the node when a box node is processed. In this case, ray 140 is tested against child bounding boxes 161-164. The children that hit the ray 140 are added to the stack 145 in the furthest to closest order from the origin of the ray 140. In this case, child bounding box 162 is added to the stack 145. The next node is popped from the stack 145. In this case, the traversal moves to the triangle node 120 and in particular to triangle 171 as shown in FIG. 6. The ray 140 intersects triangle 171 and the triangle 171 now becomes the candidate 190 as shown in FIG. 6. The traversal is finished as there no further nodes in the stack 145. The candidate 170 (triangle 171) is now known to be the closest triangle that hits the ray 140.

As illustrated, the ray and box and the ray and triangle intersections are the main primitive operations during the traversal phase. These operations are very memory bandwidth intensive and have high occurrences of random accesses. For example, each ray may fetch over 24 different 64 byte nodes. These operations are also very arithmetic logic unit (ALU) and/or compute unit intensive. These ray traces suffer from very high divergence due to different traversal lengths, (where average wave utilization is 30%), are vector general purpose register (VGPR) use intensive, and waves waterfall frequently due to high probability of containing both triangle and box nodes.

A texture processor based ray tracing acceleration method and system are described herein. A fixed function BVH intersection testing and traversal (a common and expensive operation in ray tracers) logic is implemented on texture processors. This enables the performance and power efficiency of the ray tracing to be substantially improved without expanding high area and effort costs. High bandwidth paths within the texture processor and shader units that are used for texture processing are reused for BVH intersection testing and traversal. In general, a texture processor receives an instruction from the shader unit that includes ray data and BVH node pointer information. The texture processor fetches the BVH node data from memory using, for example, 16 double word (DW) block loads. The texture processor performs four ray-box intersections and children sorting for box nodes and 1 ray-triangle intersection for triangle nodes. The intersection results are returned to the shader unit.

In particular, a fixed function ray intersection engine is added in parallel to a texture filter pipeline in a texture processor. This enables the shader unit to issue a texture instruction which contains the ray data (ray origin and ray direction) and a pointer to the BVH node in the BVH tree. The texture processor can fetch the BVH node data from memory and supply both the data from the BVH node and the ray data to the fixed function ray intersection engine. The ray intersection engine looks at the data for the BVH node and determines whether it needs to do ray-box intersection or ray-triangle intersection testing. The ray intersection engine configures its ALUs or compute units accordingly and passes the ray data and BVH node data through the configured internal ALUs or compute units to calculate the intersection results. Based on the results of the intersection testing, a state machine determines how the shader unit should advance its internal stack (traversal stack) and traverse the BVH tree. The state machine can be fixed function or programmable. The intersection testing results and/or a list of node pointers which need to be traversed next (in the order they need to be traversed) are returned to the shader unit using the texture data return path. The shader unit reviews the results of the intersection and the indications received to decide how to traverse to the next node in the BVH tree.

The hybrid approach (doing fixed function acceleration for a single node of the BVH tree) and using a shader unit to schedule the processing addresses the issues with solely hardware based and/or solely software based solutions. Flexibility is preserved since the shader unit can still control the overall calculation and can bypass the fixed function hardware where needed and still get the performance advantage of the fixed function hardware. In addition, by utilizing the texture processor infrastructure, large buffers for ray storage and BVH caching are eliminated that are typically required in a hardware raytracing solution as the existing VGPRs and texture cache can be used in its place, which substantially saves area and complexity of the hardware solution.

Figure 7:
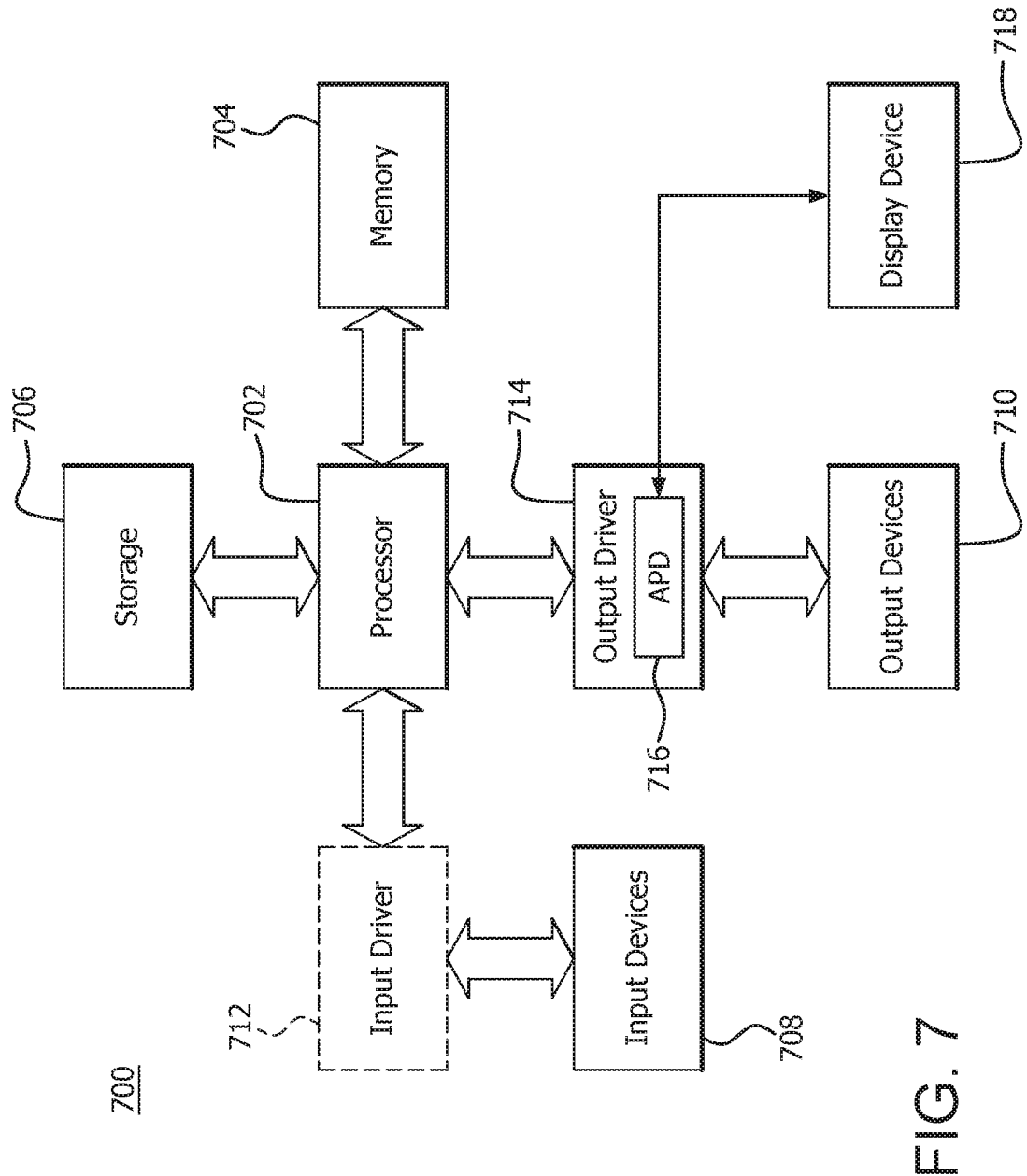
FIG. 7 is a block diagram of an example device in which one or more features of the disclosure can be implemented in accordance with certain implementations.

FIG. 7 is a block diagram of an example device 700 in which one or more features of the disclosure can be implemented. The device 700 can include, for example, a computer, a gaming device, a handheld device, a set-top box, a television, a mobile phone, or a tablet computer. The device 700 includes a processor 702, a memory 704, a storage 706, one or more input devices 708, and one or more output devices 710. The device 700 can also optionally include an input driver 712 and an output driver 714. It is understood that the device 700 can include additional components not shown in FIG. 7.

In various alternatives, the processor 702 includes a central processing unit (CPU), a graphics processing unit (GPU), a CPU and GPU located on the same die, or one or more processor cores, wherein each processor core can be a CPU or a GPU. In various alternatives, the memory 704 is be located on the same die as the processor 702, or is located separately from the processor 702. The memory 704 includes a volatile or non-volatile memory, for example, random access memory (RAM), dynamic RAM, or a cache.

The storage 706 includes a fixed or removable storage, for example, a hard disk drive, a solid state drive, an optical disk, or a flash drive. The input devices 708 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 710 include, without limitation, a display, a speaker, a printer, a haptic feedback device, one or more lights, an antenna, or a network connection (e.g., a wireless local area network card for transmission and/or reception of wireless IEEE 802 signals).

The input driver 712 communicates with the processor 702 and the input devices 708, and permits the processor 702 to receive input from the input devices 708. The output driver 714 communicates with the processor 702 and the output devices 710, and permits the processor 702 to send output to the output devices 710. It is noted that the input driver 712 and the output driver 714 are optional components, and that the device 700 will operate in the same manner if the input driver 712 and the output driver 714 are not present. The output driver 716 includes an accelerated processing device ("APD") 716 which is coupled to a display device 718. The APD is configured to accept compute commands and graphics rendering commands from processor 702, to process those compute and graphics rendering commands, and to provide pixel output to display device 718 for display. As described in further detail below, the APD 716 includes one or more parallel processing units configured to perform computations in accordance with a single-instruction-multiple-data ("SIMD") paradigm. Thus, although various functionality is described herein as being performed by or in conjunction with the APD 716, in various alternatives, the functionality described as being performed by the APD 716 is additionally or alternatively performed by other computing devices having similar capabilities that are not driven by a host processor (e.g., processor 702) and configured to provide graphical output to a display device 718. For example, it is contemplated that any processing system that performs processing tasks in accordance with a SIMD paradigm may be configured to perform the functionality described herein. Alternatively, it is contemplated that computing systems that do not perform processing tasks in accordance with a SIMD paradigm can perform the functionality described herein.

Figure 8:
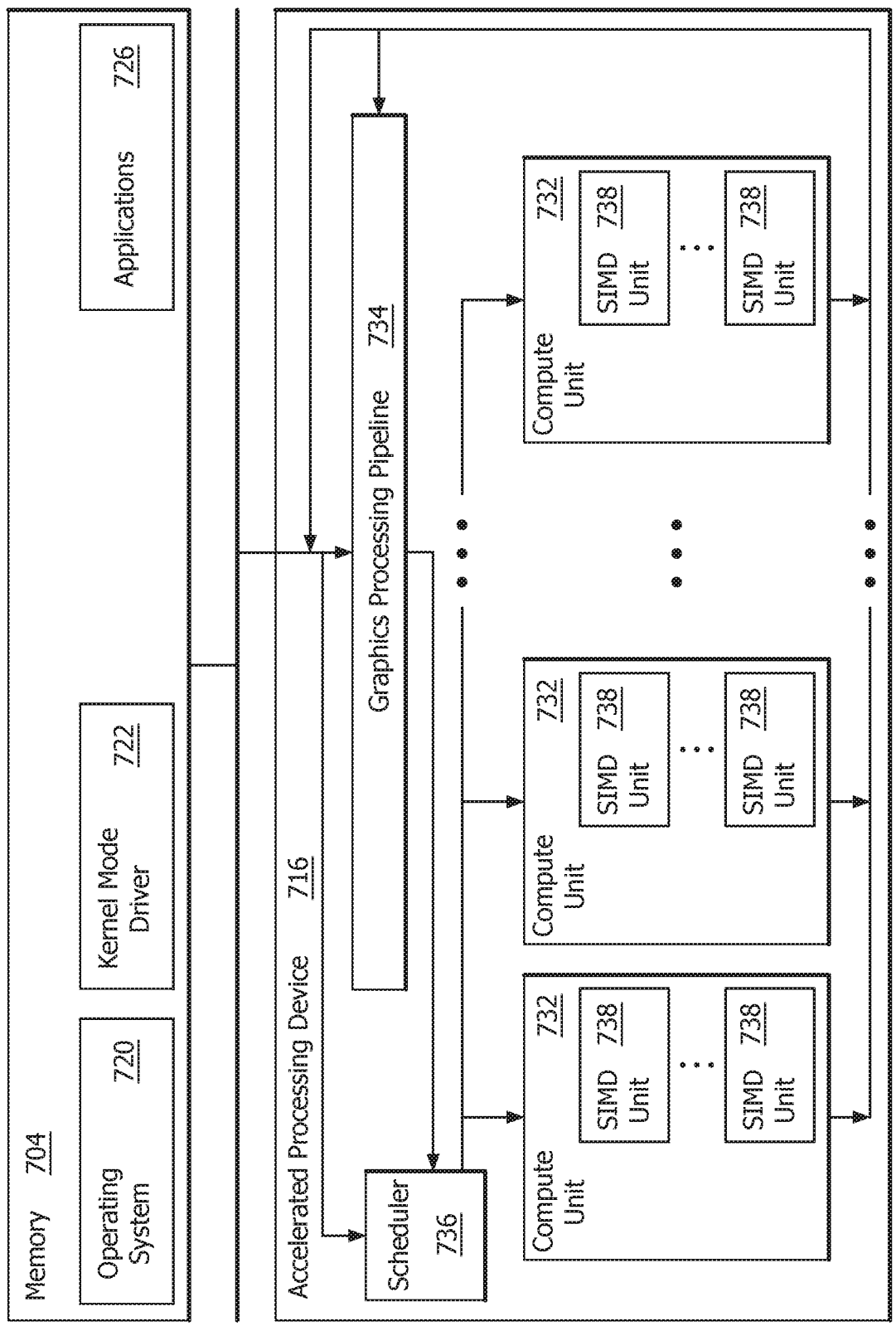
FIG. 8 is a block diagram of the device of FIG. 7, illustrating additional detail in accordance with certain implementations.

FIG. 8 is a block diagram of the device 700, illustrating additional details related to execution of processing tasks on the APD 716. The processor 702 maintains, in system memory 704, one or more control logic modules for execution by the processor 702. The control logic modules include an operating system 720, a kernel mode driver 722, and applications 726. These control logic modules control various features of the operation of the processor 702 and the APD 716. For example, the operating system 720 directly communicates with hardware and provides an interface to the hardware for other software executing on the processor 702. The kernel mode driver 722 controls operation of the APD 716 by, for example, providing an application programming interface ("API") to software (e.g., applications 726) executing on the processor 702 to access various functionality of the APD 716. The kernel mode driver 722 also includes a just-in-time compiler that compiles programs for execution by processing components (such as the SIMD units 738 discussed in further detail below) of the APD 716.

The APD 716 executes commands and programs for selected functions, such as graphics operations and non-graphics operations that may be suited for parallel processing. The APD 716 can be used for executing graphics pipeline operations such as pixel operations, geometric computations, and rendering an image to display device 718 based on commands received from the processor 702. The APD 716 also executes compute processing operations that are not directly related to graphics operations, such as operations related to video, physics simulations, computational fluid dynamics, or other tasks, based on commands received from the processor 702.

The APD 716 includes compute units 732 that include one or more SIMD units 738 that are configured to perform operations at the request of the processor 702 in a parallel manner according to a SIMD paradigm. The SIMD paradigm is one in which multiple processing elements share a single program control flow unit and program counter and thus execute the same program but are able to execute that program with different data. In one example, each SIMD unit 738 includes sixteen lanes, where each lane executes the same instruction at the same time as the other lanes in the SIMD unit 738 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 732 is a work-item. Each work-item represents a single instantiation of a program that is to be executed in parallel in a particular lane. Work-items can be executed simultaneously as a "wavefront" on a single SIMD processing unit 738. One or more wavefronts are included in a "work group," which includes a collection of work-items designated to execute the same program. A work group can be executed by executing each of the wavefronts that make up the work group. In alternatives, the wavefronts are executed sequentially on a single SIMD unit 738 or partially or fully in parallel on different SIMD units 738. Wavefronts can be thought of as the largest collection of work-items that can be executed simultaneously on a single SIMD unit 738. Thus, if commands received from the processor 702 indicate that a particular program is to be parallelized to such a degree that the program cannot execute on a single SIMD unit 738 simultaneously, then that program is broken up into wavefronts which are parallelized on two or more SIMD units 738 or serialized on the same SIMD unit 738 (or both parallelized and serialized as needed). A scheduler 736 is configured to perform operations related to scheduling various wavefronts on different compute units 732 and SIMD units 738.

The parallelism afforded by the compute units 732 is suitable for graphics related operations such as pixel value calculations, vertex transformations, and other graphics operations. Thus in some instances, a graphics pipeline 734, which accepts graphics processing commands from the processor 702, provides computation tasks to the compute units 732 for execution in parallel.

The compute units 732 are also used to perform computation tasks not related to graphics or not performed as part of the "normal" operation of a graphics pipeline 734 (e.g., custom operations performed to supplement processing performed for operation of the graphics pipeline 734). An application 726 or other software executing on the processor 702 transmits programs that define such computation tasks to the APD 716 for execution.

Figure 9:
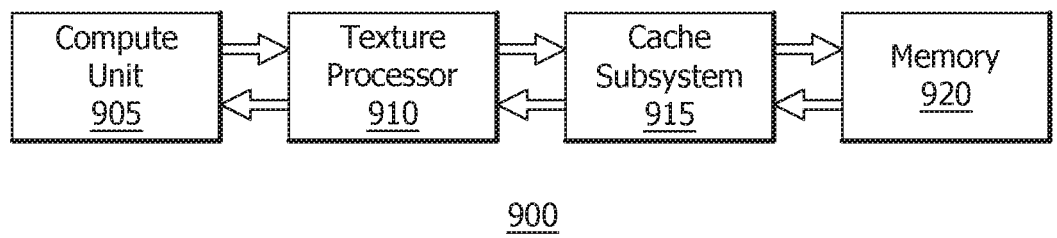
FIG. 9 is a high level block diagram of an example texture processor based ray tracing accelerator system in accordance with certain implementations.

FIG. 9 is a high level block diagram of an example texture processor based ray tracing accelerator system 900 in accordance with certain implementations. The texture processor based ray tracing accelerator system 900 includes a compute unit 905 connected to or in communication with (collectively "connected to") a texture processor 910, which in turn is connected to a cache system 915. The cache system 915 is connected to a memory 920. The compute unit 905 executes shader programs which control traversal operations performed by the texture processor 910. Alternatively, shader functionality can be implemented partially or fully as fixed-function, non-programmable hardware external to the compute unit 905. The texture processor 910 performs texture sampling operations and BVH node intersection operations pursuant to instructions from the compute unit 905. The texture processor 910 reads texture and BVH data from the cache system 915 or the memory 920, as appropriate. The texture processor 910 returns the intersection results to the compute unit 905 for processing.

Figure 10:
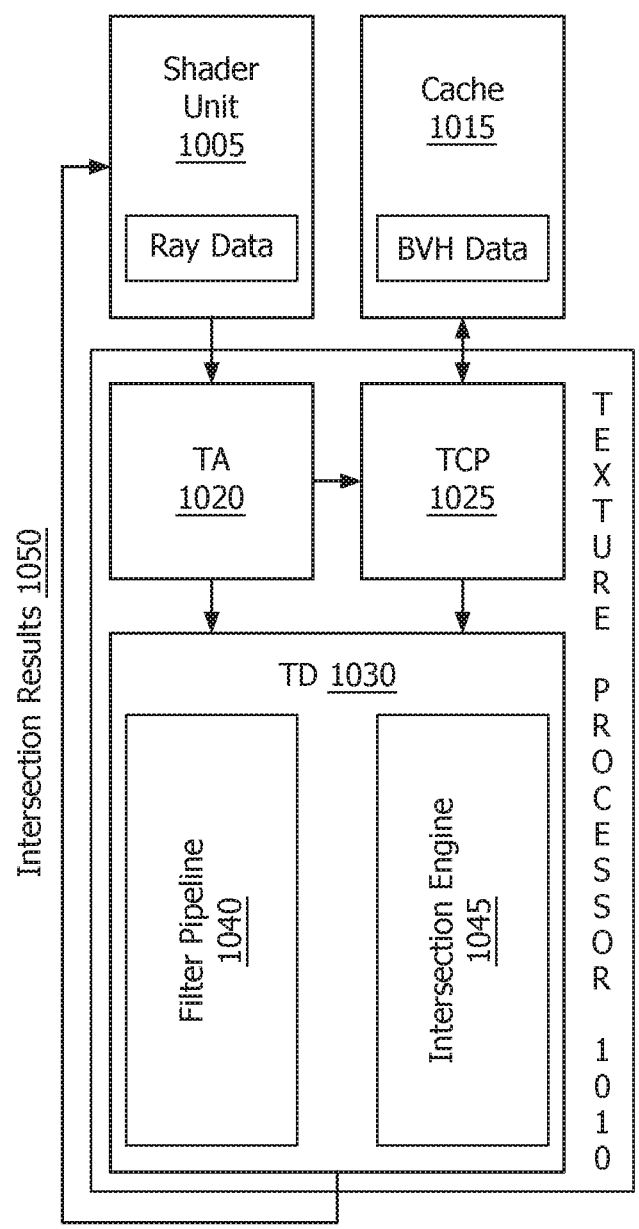
FIG. 10 is a more detailed block diagram of an example texture processor based ray tracing accelerator system in accordance with certain implementations.

FIG. 10 is a more detailed block diagram of an example texture processor based ray tracing accelerator system 1000 in accordance with certain implementations. The texture processor based ray tracing accelerator system 1000 includes a shader unit or shader processor 1005 connected to or in communication with (collectively "connected to") a texture processor 1010, which in turn is connected to a cache 1015. The texture processor 1010 includes a texture address (TA) unit 1020 which is connected to a texture cache (TCP) 1025, which in turn is connected to the cache 1015. The texture address unit 1020 and the texture cache 1025 are also connected to a texture data (TD) unit 1030. The texture data unit 1030 is a data filtering unit and includes a filter pipeline unit 1040 which is functionally in parallel with an intersection engine 1045. The intersection engine 1045 is connected to the shader unit 1005 via a texture data return path 1050. In an implementation, the filter pipeline unit 1040 and the intersection engine 1045 can be integrated. In another implementation, the texture data unit 1030 can include only the intersection engine 1045.

At a top level, the shader unit 1005 sends a texture instruction to the texture address unit 1020. The texture instruction contains the ray data (ray origin, and ray direction) in an addressing format and a BVH pointer to a BVH node in a BVH tree. The texture address unit 1020 filters/processes the addressing format to obtain the ray data. The texture address unit 1020 decodes the BVH pointer to determine the BVH node, the type of BVH node and the amount of data needed for the BVH node. The texture address unit 1020 determines the address for the BVH node data and fetches the BVH node data from the texture cache 1025. The texture cache 1025 sends the BVH node data to the texture data unit 1030 if available or obtains the BVH node data from cache 1015 and then sends the BVH node data to the texture data unit 1030.

The intersection engine 1045 receives the ray data and the BVH node data and determines whether to perform ray-box intersection or ray-triangle intersection testing and configures the ALUs or compute units in the intersection engine 1045 to perform the correct calculation depending on the BVH node type. The ray intersection engine 1045 passes the ray data and BVH node data through the configured ALUs or compute units to calculate the intersection results. Based on the results of the intersection testing, a state machine determines how the shader unit 1005 should advance the shader unit's 1005 internal stack (traversal stack) and traverse the BVH tree. The intersection testing results and/or a list of node pointers which need to be traversed next (in the order they need to be traversed) are returned to the shader unit 1005 via the texture data return path 1050. The shader unit 1005 reviews the results of the intersection and the indications received to decide how to traverse to the next BVH node of the BVH tree.

FIGS. 11A-11E, 12A-12F, 13A-13E, 14, 15A-15D, 16A-16F and 17A-17D illustrate a traversal from the perspective of the texture processor based ray tracing accelerator system 1000 shown in FIG. 10. FIGS. 11A-11E illustrate the shader unit 1005 sending an instruction to a texture processor in accordance with certain implementations. In particular, the shader unit 1005 sends waves or wavefronts of BVH node pointer 1105, ray origin 1110, ray direction 1115, inverse ray direction 1120 and ray extent (shown as Max T) 1125 data to the texture address unit 1020. The ray data (ray origin 1110, ray direction 1115, inverse ray direction 1120 and ray extent 1125) is sent in an addressing format that is then filtered/processed by texture address unit 1020. In an implementation, the information or data is collected in a buffer row wise. In the illustrative example, this results in columns 1-8 as shown in FIG. 11E. In an illustrative example, some lanes in the wave are empty due to wave divergence. For example, columns 2, 3 and 5 are empty or inactive lanes as shown in FIG. 11E.

Figure 12E:
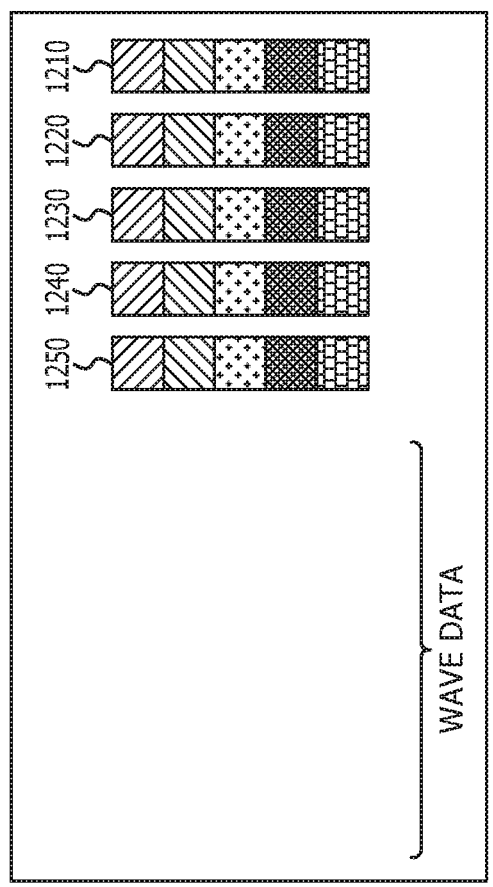
Figure 12F:
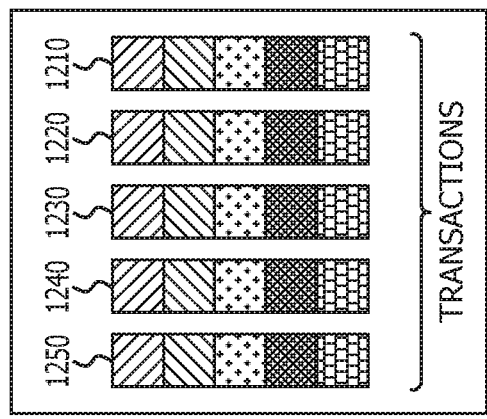

FIGS. 12A-12F illustrate transaction generation. Data is read out of the buffer column wise skipping empty lanes 1190 (shown as columns 4, 6 and 7 in FIG. 12A) in the wave to generate the number of transactions 1200 to be processed by the intersection engine 1045. The number of generated transactions 1200 is dependent on the number of active lanes in the original wave(s). Inactive lanes do not contribute to the computation. Consequently, there are no memory requests or use of memory bandwidth for these inactive lanes in the wave(s). In particular, Column 1 is read out to generate transaction 1210 as shown in FIG. 12A. Columns 2 and 3 are skipped. Column 4 is then read out to generate transaction 1220 as shown in FIG. 12B. Column 5 is skipped. Column 6 is then read out to generate transaction 1230 as shown in FIG. 12C. Column 7 is then read out to generate transaction 1240 as shown in FIG. 12D. Column 8 is then read out to generate transaction 1250 as shown in FIG. 12D to complete generation of transactions 1200.

Figure 13A:
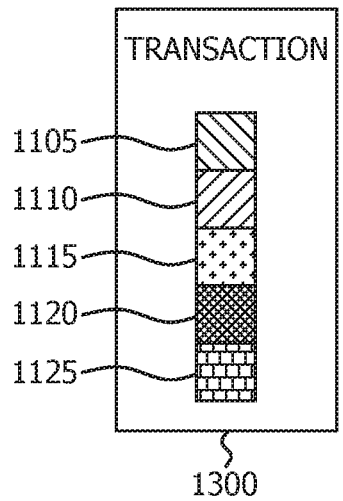
FIGS. 13A-13E illustrate transaction processing in accordance with certain implementations.
Figure 13B:
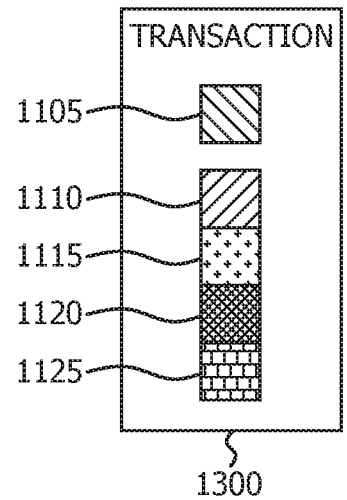
Figure 13C:
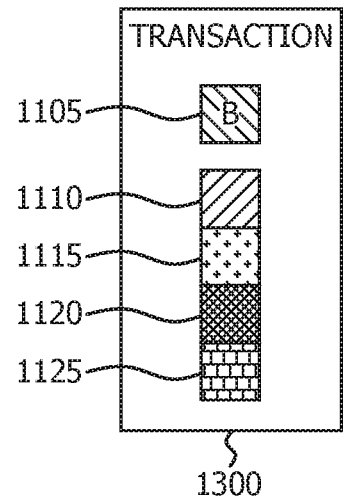
Figure 13D:
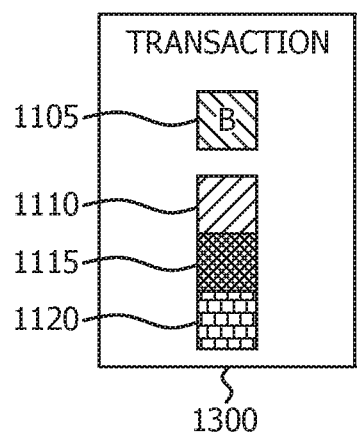
Figure 13E:
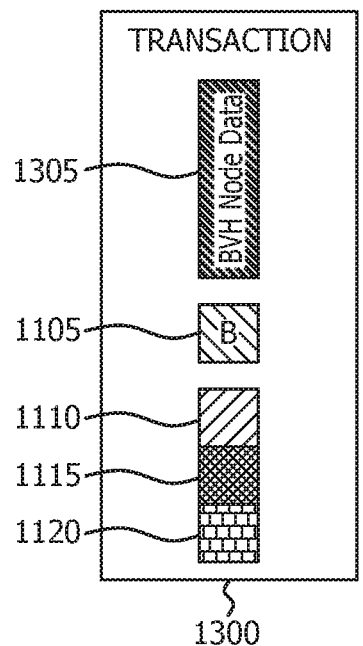

Each transaction 1300 from the number of transactions 1200 is then processed as illustrated in FIGS. 13A-13E. The BVH node pointer 1105 is separated from the rest of the transaction 1300 as shown in FIG. 13B and decoded by the texture address unit 1020 to determine the BVH node, the type of BVH node, and the amount of data needed for the BVH node as shown in FIG. 13C. Based on the BVH node type, certain types of data are discarded. For example, if the BVH node is a box node type then the ray direction 1115 can be discarded and if the BVH node is a triangle node type then the inverse ray direction 1120 can be discarded (not shown in FIGS. 13A-13E). In the illustrative example shown in FIG. 13D, the BVH node is a box node type and the ray direction 1115 is discarded. The texture address unit 1020 fetches the BVH node data 1305 from the texture cache 1025 or cache 1015 as shown in FIG. 13E.

Figure 14:
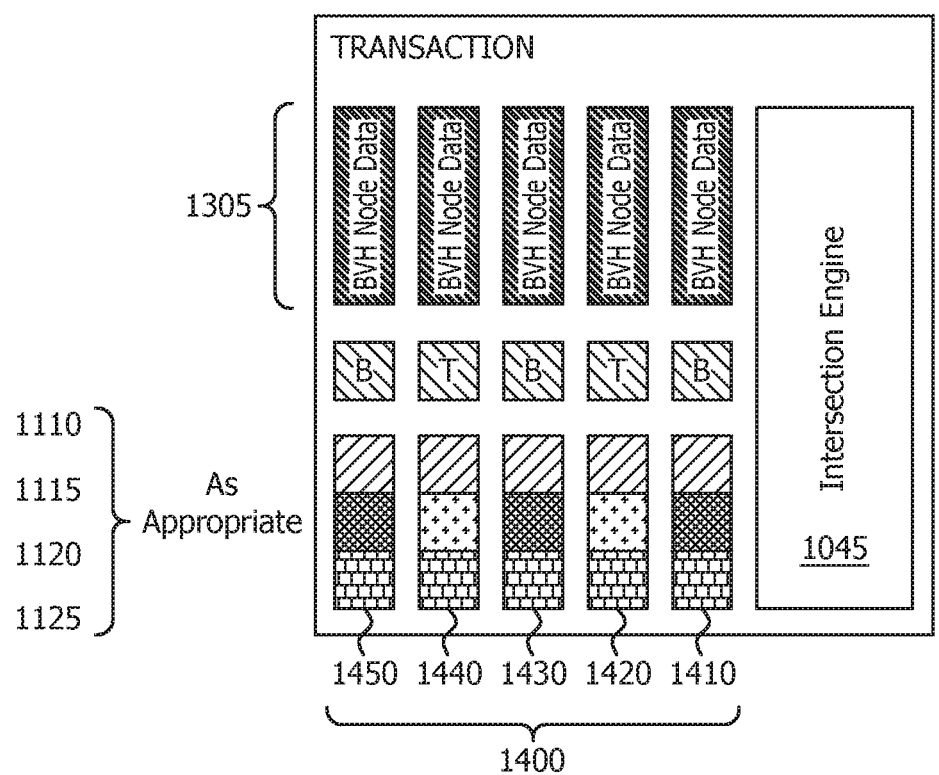
FIG. 14 illustrates a number of transactions waiting for intersection processing in accordance with certain implementations.

FIG. 14 shows an illustrative example of processed transactions 1400 which include processed transactions 1410-1450. As illustrated, processed transaction 1410 includes BVH node data 1305, BVH node pointer 1105, ray origin 1110, inverse ray direction 1120 and ray extent (shown as Max T) 1125. Processed transaction 1420 includes BVH node data 1305, BVH node pointer 1105, ray origin 1110, ray direction 1115, and ray extent (shown as Max T) 1125. Processed transaction 1430 includes BVH node data 1305, BVH node pointer 1105, ray origin 1110, inverse ray direction 1120 and ray extent (shown as Max T) 1125. Processed transaction 1440 includes BVH node data 1305, BVH node pointer 1105, ray origin 1110, ray direction 1115, and ray extent (shown as Max T) 1125. Processed transaction 1450 includes BVH node data 1305, BVH node pointer 1105, ray origin 1110, inverse ray direction 1120 and ray extent (shown as Max T) 1125. The BVH node data 1305 and the appropriate ray data (which may include ray origin 1110, ray direction 1115, inverse ray direction 1120 and ray extent 1125 depending on BVH node type) are sent to and processed by the intersection engine 1045 to generate the intersection results for each of the number of processed transactions 1400.

Figure 15A:
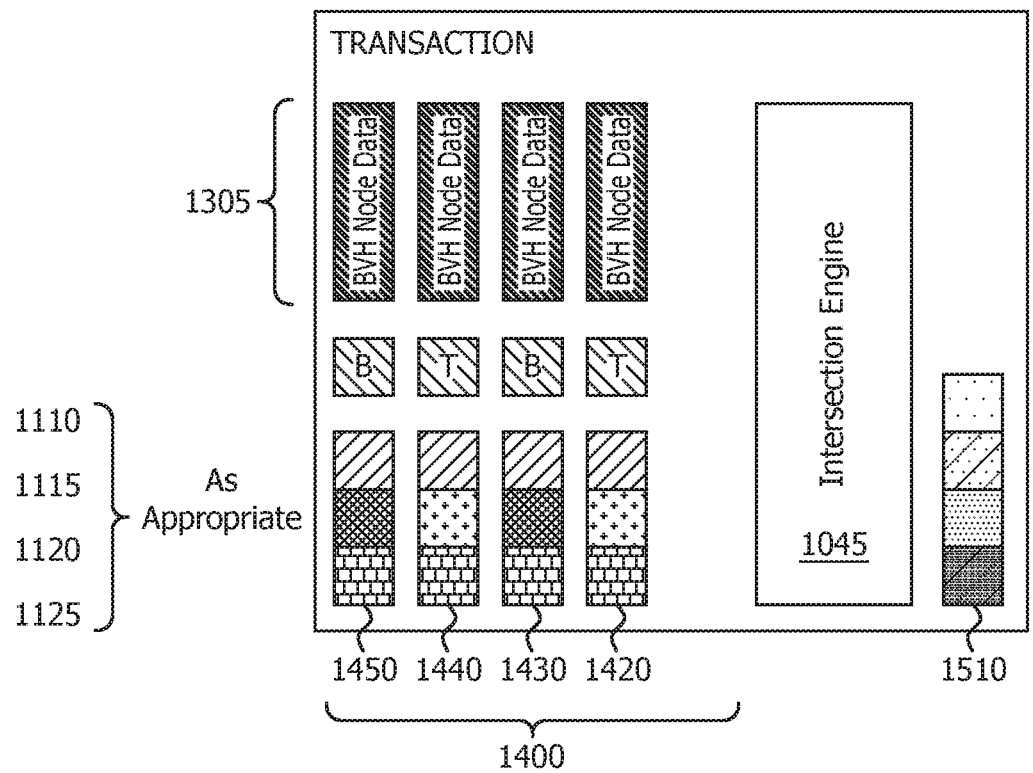
FIGS. 15A-15D illustrate intersection processing in accordance with certain implementations.
Figure 15B:
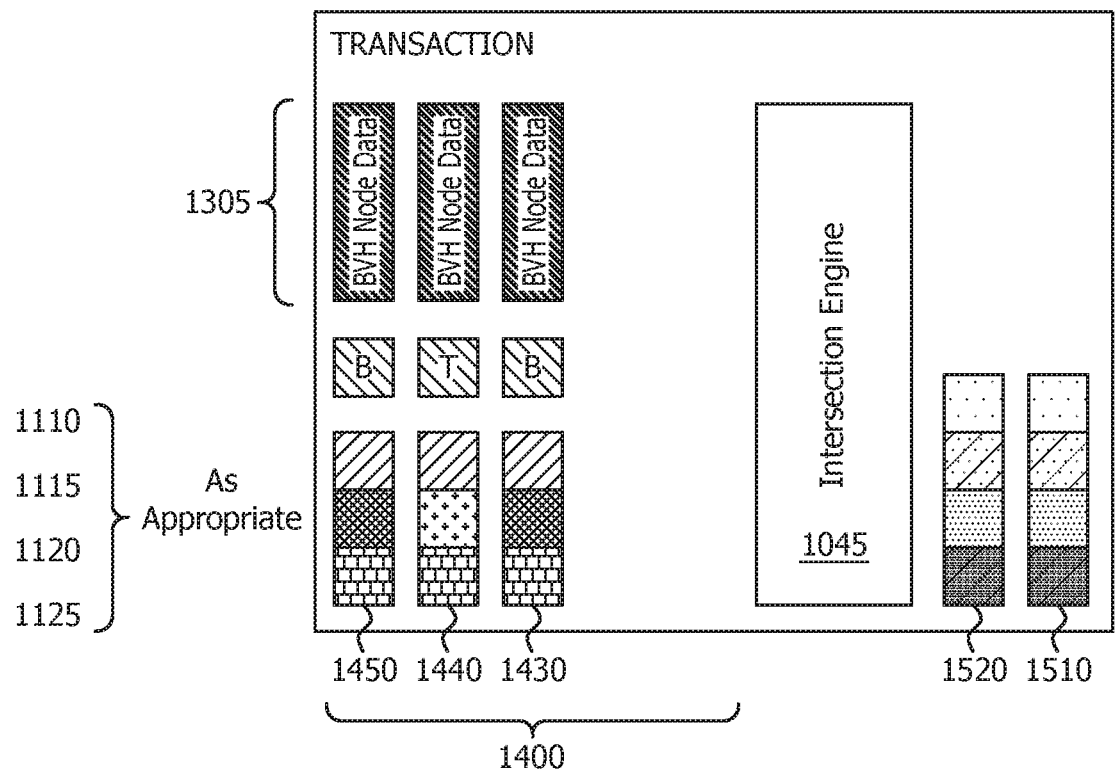
Figure 15C:
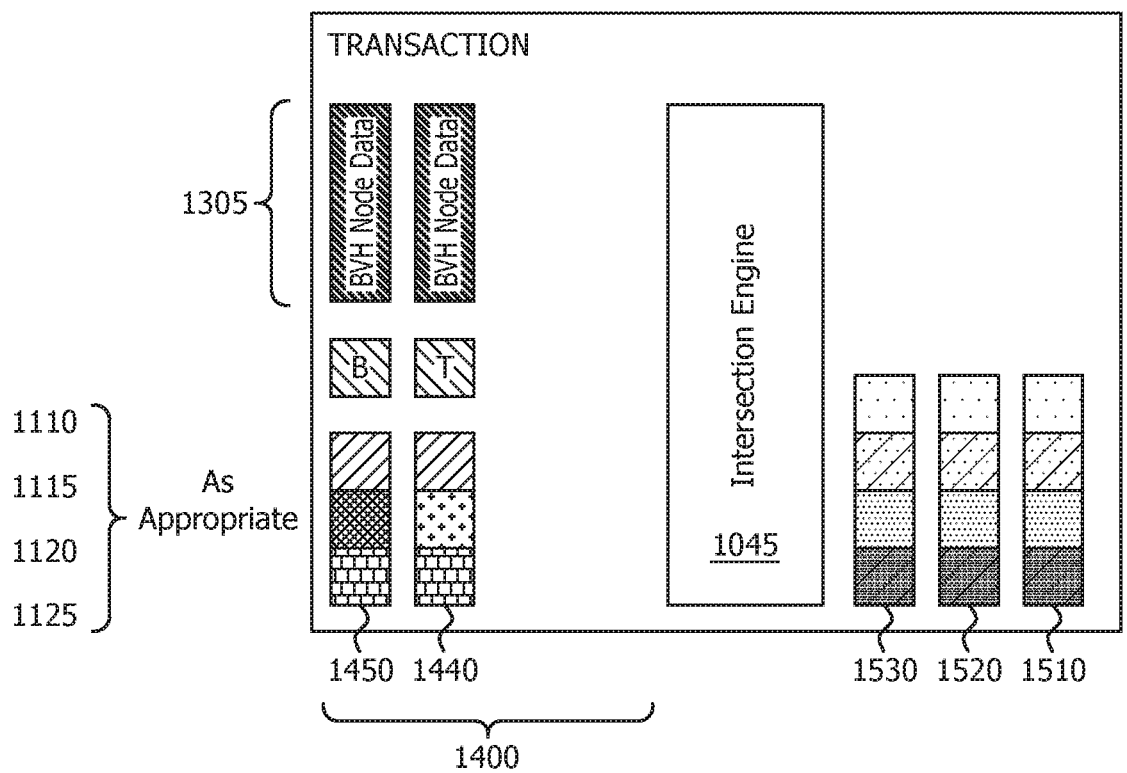
Figure 15D:
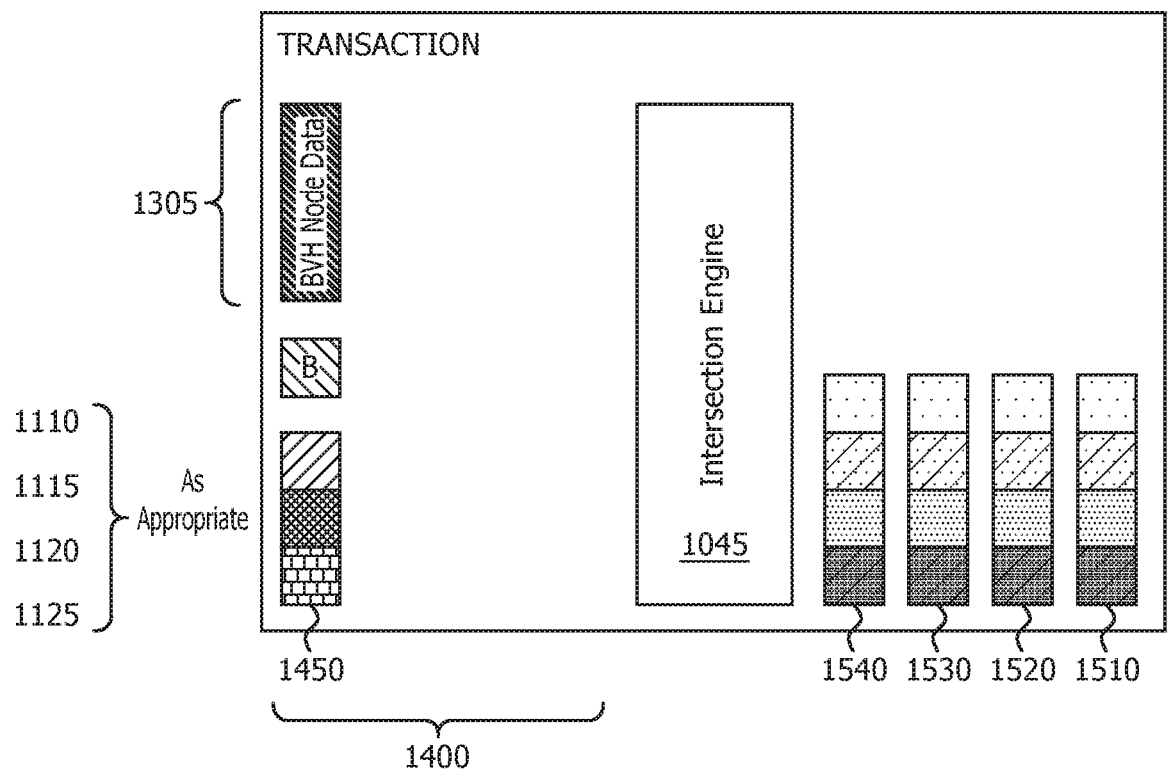
Figure 16A:
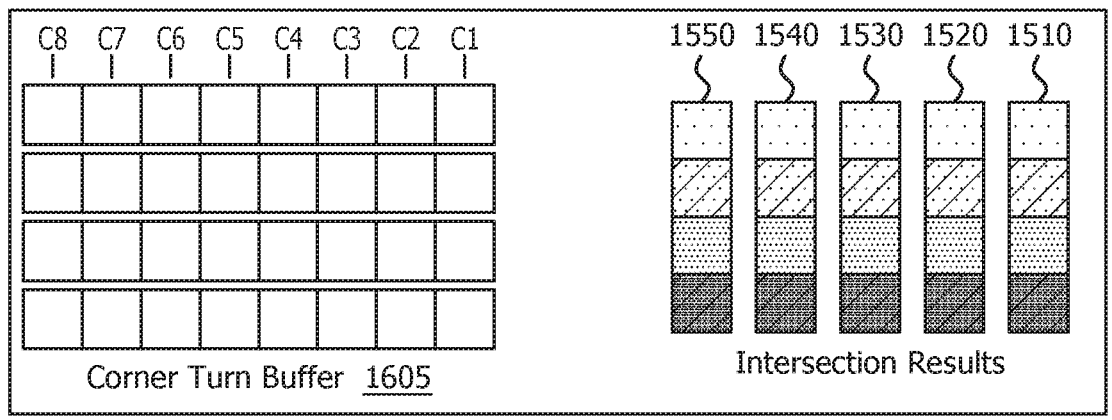
FIGS. 16A-16F illustrate writing of intersection results to a buffer in accordance with certain implementations.

FIGS. 15A-15D illustrate intersection processing in accordance with certain implementations. FIG. 15A illustrates the intersection processing of processed transaction 1410 by the intersection engine 1045 to generate intersection results 1510. FIG. 15B illustrates the intersection processing of processed transaction 1420 by the intersection engine 1045 to generate intersection results 1520. FIG. 15C illustrates the intersection processing of processed transaction 1430 by the intersection engine 1045 to generate intersection results 1530. FIG. 15D illustrates the intersection processing of processed transaction 1440 by the intersection engine 1045 to generate intersection results 1540. A complete set of intersection results 1510-1550 is shown in FIG. 16A.

Figure 16B:
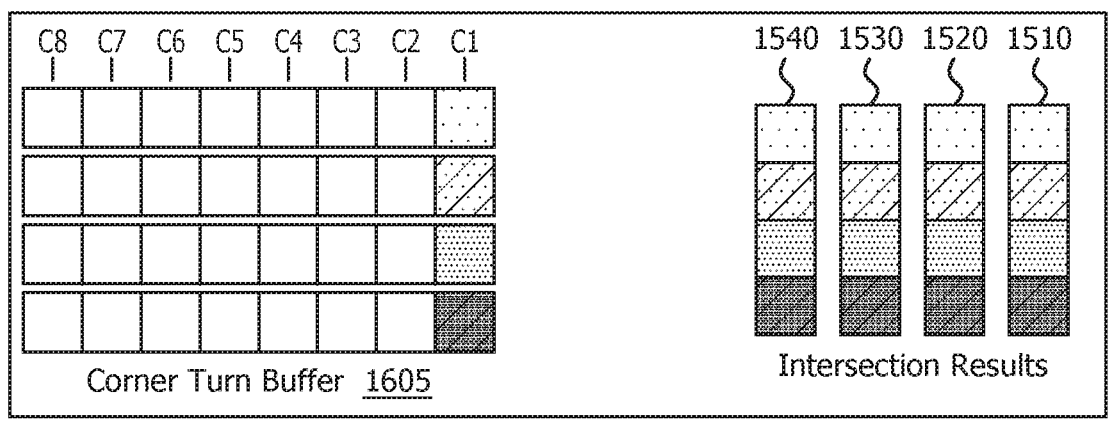
Figure 16C:
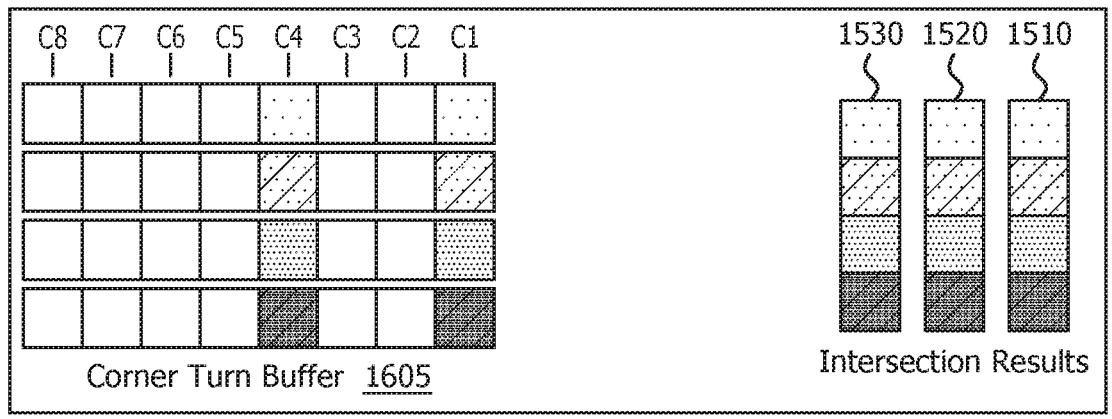

FIGS. 16A-16F show an illustrative example of writing the intersection results 1510-1550 to a corner turn buffer 1605 based on the lane identification in the wave(s) that generated the transaction. This is done to re-create intersection results 1510-1540 into the wave(s) format used by the shader unit 1005. In particular, intersection result 1510 is written into column 1 as shown in FIG. 16B. Intersection result 1520 is written into column 4 as shown in FIG. 16C as columns 2 and 3 were empty lanes. Intersection result

Figure 16D:
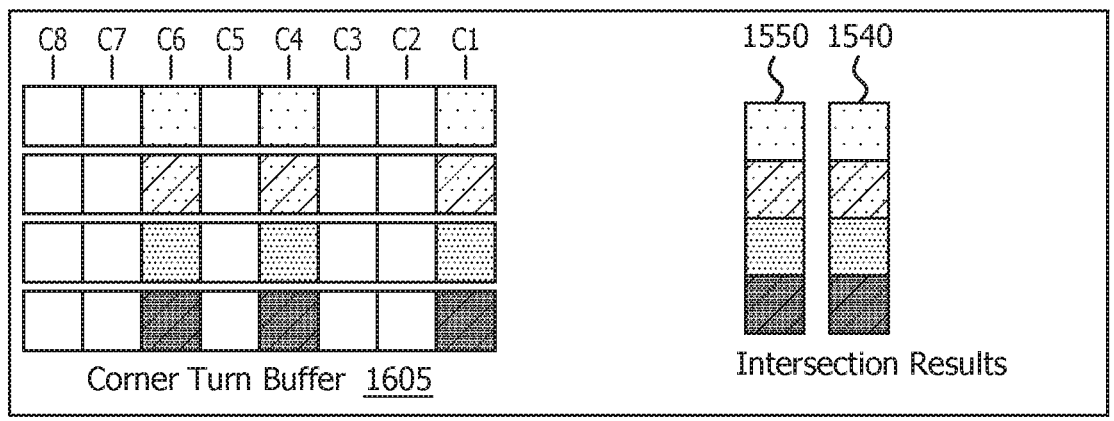
Figure 16E:
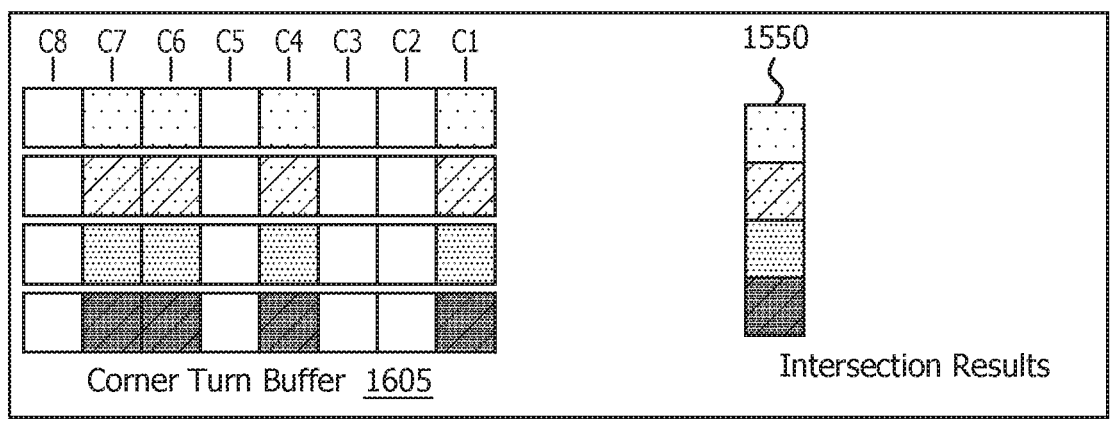
Figure 16F:
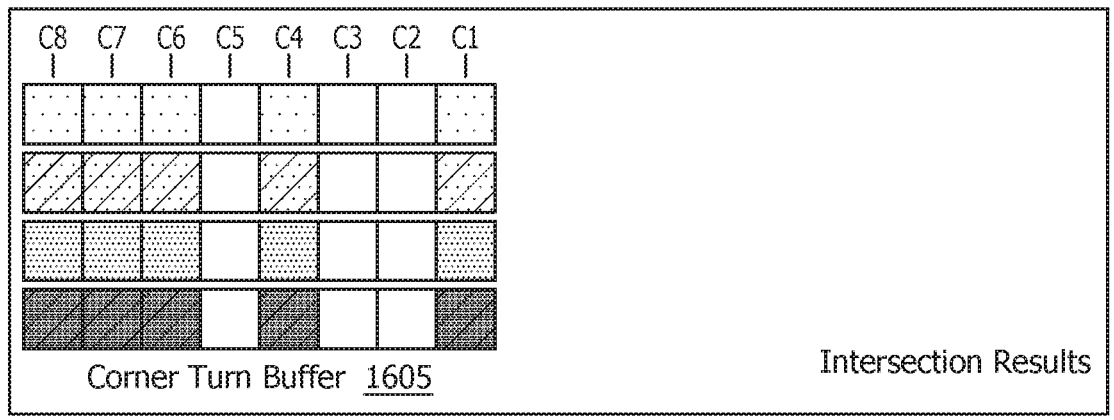

1530 is written into column 6 as shown in FIG. 16D as column 5 was an empty lane. Intersection result 1540 is written into column 7 as shown in FIG. 16E. Intersection result 1550 is written into column 7 as shown in FIG. 16F.

Figure 17A:
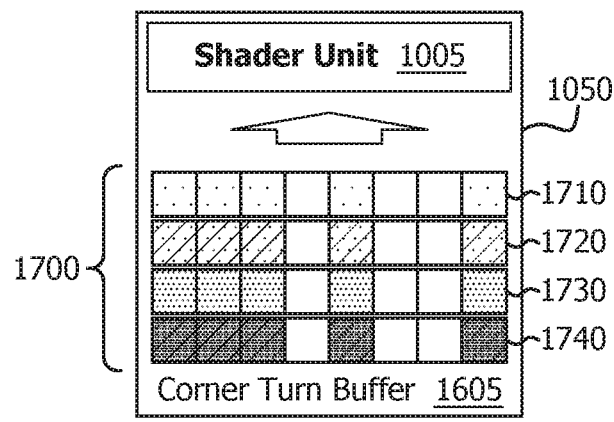
FIGS. 17A-17D illustrate providing of intersection results to the shader unit in accordance with certain implementations.
Figure 17B:
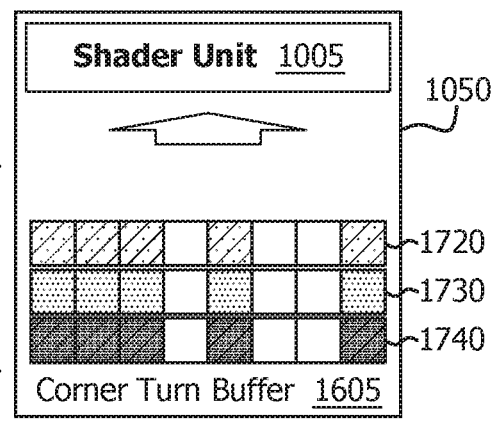
Figure 17C:
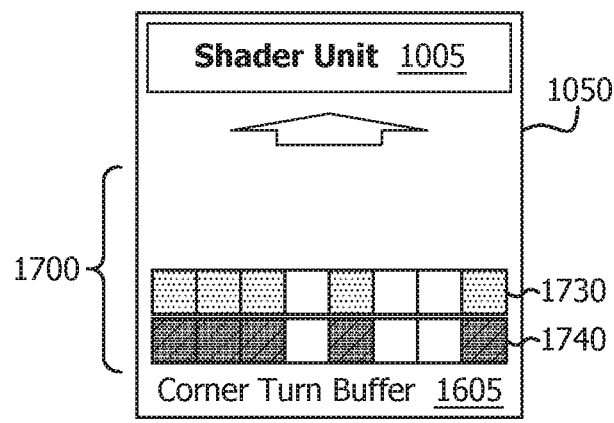
Figure 17D:
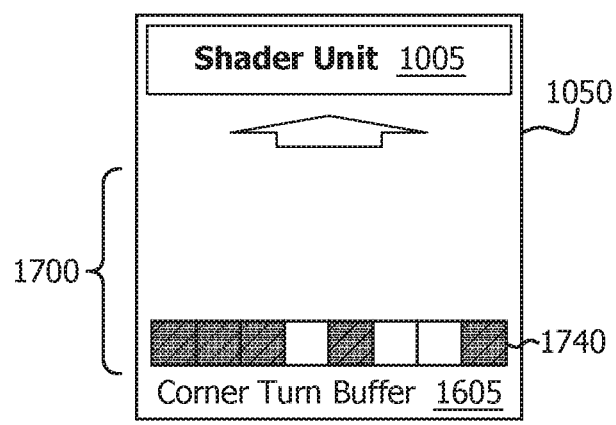

FIGS. 17A-17D show an illustrative example of reading from the corner turn buffer 1605 row wise to provide intersection results 1700 to the shader unit 1005 via the texture data return path 1050. In particular, row 1710 is read and sent to the shader unit 1005 via the texture data return path 1050 as shown in FIG. 17A. Row 1720 is read and sent to the shader unit 1005 via the texture data return path 1050 as shown in FIG. 17B. Row 1730 is read and sent to the shader unit 1005 via the texture data return path 1050 as shown in FIG. 17C. Row 1740 is read and sent to the shader unit 1005 via the texture data return path 1050 as shown in FIG. 17D. The shader unit 1005 processes the intersection results on compute units, which for example include SIMD units.

As shown and illustrated with respect to certain implementations, the intersection testing is fused with data fetch operations. The intersection testing is performed asynchronously from the shader unit similar to texture filtering operations. The intersection processing eliminates inactive lanes. Consequently, operation takes less cycles to complete on a non-fully occupied wave and effectively removes wave divergence costs from intersection testing. The texture processor does not control traversal as the traversal is controlled by the shader unit. This enables user flexibility on traversal algorithm and allows the user to install custom node types into the BVH.

Figure 18:
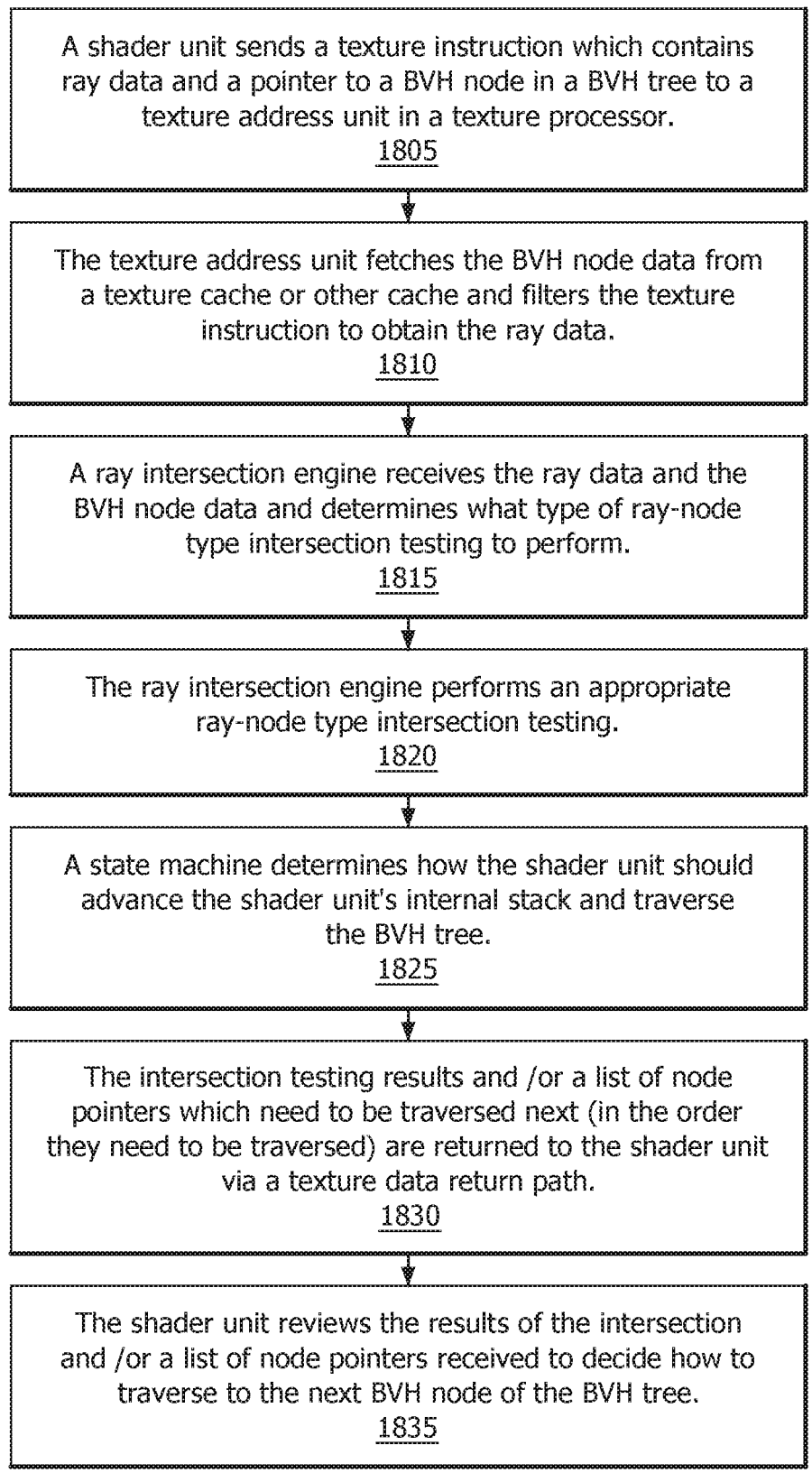
FIG. 18 is a flowchart for a method for texture processor based ray tracing acceleration in accordance with certain implementations.

FIG. 18 is a flowchart 1800 for a method for texture processor based ray tracing acceleration in accordance with certain implementations. A shader unit sends a texture instruction which contains ray data and a pointer to a BVH node in a BVH tree to a texture address unit in a texture processor (step 1805). The texture address unit fetches the BVH node data from a texture cache or other cache and filters the texture instruction to obtain the ray data (step 1810). A ray intersection engine receives the ray data and the BVH node data and determines what type of ray-node type intersection testing to perform (step 1815). The ray intersection engine performs an appropriate ray-node type intersection testing (step 1820). For example, the ray intersection engine can perform ray-box intersection or ray-triangle intersection testing. Based on the results of the intersection testing, a state machine determines how the shader unit should advance the shader unit's internal stack (traversal stack) and traverse the BVH tree (step 1825). The intersection testing results and/or a list of node pointers which need to be traversed next (in the order they need to be traversed) are returned to the shader unit via a texture data return path 1050 (step 1830). The shader unit reviews the results of the intersection and/or a list of node pointers received to decide how to traverse to the next BVH node of the BVH tree (step 1835).

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for texture processor based ray tracing acceleration, the method comprising:
   receiving, at a texture processor from a shader, a texture instruction which includes at least a bounded volume hierarchy (BVH) node pointer and ray data;
   fetching, by the texture processor, BVH node data from a cache based on the BVH node pointer;
   receiving, by a ray intersection engine of the texture processor, the ray data and the BVH node data;
   performing, by the ray intersection engine of the texture processor, ray-BVH node type intersection testing using the ray data and the BVH node data; and
   sending, by the ray intersection engine via a texture data return path to the shader, intersection results based on the ray-BVH node type intersection testing.

2. The method of claim 1, further comprising:
   decoding the texture instruction to determine a BVH node type and a data address; and
   filtering the texture instruction to obtain the ray data.

3. The method of claim 2, further comprising:
   discarding portions of the ray data based on the BVH node type.

4. The method of claim 2, further comprising:
   discarding ray direction data when the BVH node type is a box node.

5. The method of claim 2, further comprising:
   discarding inverse ray direction data when the BVH node type is a triangle node.

6. The method of claim 1, wherein the ray data and the BVH node data are received in waves, the method further comprising:
   generating at least one transaction based on the ray data and the BVH node data, wherein transactions are not generated for inactive lanes in the waves.

7. The method of claim 1, wherein the ray data and the BVH node data are received in waves, the method further comprising:
   generating transactions based on the ray data and the BVH node data, wherein each transaction is generated from an active lane in the waves.

8. The method of claim 7, wherein the ray data and the BVH node data are received in waves, the method further comprising:

writing the intersection results to a buffer based on lane identification to account for inactive lanes in the waves.

9. The method of claim 1, further comprising:
advancing traversal by the shader using the intersection results.

10. A texture processor based ray tracing acceleration system, the system comprising:
a shader;
a cache;
a texture processor including at least a ray intersection engine, the texture processor connected to the shader and the cache,
wherein the texture processor is configured to:
receive, from the shader, a texture instruction which includes at least a bounded volume hierarchy (BVH) node pointer and ray data; and
fetch BVH node data from the cache based on the BVH node pointer, wherein the ray intersection engine is configured to:
receive the ray data and the BVH node data;
perform ray-BVH node type intersection testing using the ray data and the BVH node data; and
send intersection results based on the ray-BVH node type intersection testing via a texture data return path to the shader.

11. The system of claim 10, wherein the texture processor is configured to:
decode the texture instruction to determine a BVH node type and a data address; and
filter the texture instruction to obtain the ray data.

12. The system of claim 11, wherein the texture processor is configured to discard portions of the ray data based on the BVH node type.

13. The system of claim 11, wherein the texture processor is configured to discard ray direction data when the BVH node type is a box node.

14. The system of claim 11, wherein the texture processor is configured to discard inverse ray direction data when the BVH node type is a triangle node.

15. The system of claim 10, wherein the ray data and the BVH node data are received in waves, and the ray intersection engine is further configured to generate at least one transaction based on the ray data and the BVH node data, wherein transactions are not generated for inactive lanes in the waves.

16. The system of claim 10, wherein the ray data and the BVH node data are received in waves, and the ray intersection engine is further configured to generate transactions based on the ray data and the BVH node data, wherein each transaction is generated from active lanes in the waves.

17. The system of claim 16, wherein the ray data and the BVH node data are received in waves, and the ray intersection engine is configured to write the intersection results to a buffer based on lane identification to account for inactive lanes in the waves.

18. The system of claim 10, the texture processor further comprising a state machine, wherein the state machine is configured to generate using the intersection results an indicator on how the shader should advance a traversal stack.

19. A texture processor comprising:
an interface connected to a shader;
a texture cache;
a texture data unit connected to the interface, the texture cache, and the shader;
wherein:
the texture data unit is configured to:
receive from the shader a texture instruction which includes at least a bounded volume hierarchy (BVH) node pointer and ray data;
filter the texture instruction to obtain the ray data;
fetch BVH node data from the texture cache based on the BVH node pointer;
receive the ray data and the BVH node data;
perform ray-BVH node type intersection testing using the ray data and the BVH node data; and
send intersection results based on the ray-BVH node type intersection testing via a texture data return path to the shader.

20. The texture processor of claim 19, wherein the ray data and the BVH node data are received for waves, and the texture data unit is further configured to generate transactions based on the ray data and the BVH node data, wherein each transaction is generated from active lanes in the waves.

* * * * *